(12) United States Patent
Schoukens et al.

(10) Patent No.: US 6,733,561 B2
(45) Date of Patent: May 11, 2004

(54) PRODUCTION OF HIGH TITANIA SLAG FROM ILMENITE

(75) Inventors: Albert Francois Simon Schoukens, Gauteng (ZA); David John Morris, Saldanha (ZA); Frederick Stephen McComb, Saldanha (ZA)

(73) Assignee: Anglo Operations Limited, Gauteng (ZA)

(*) Notice: Subject to any disclaimer, the term of this patent is extended or adjusted under 35 U.S.C. 154(b) by 0 days.

(21) Appl. No.: 10/284,636

(22) Filed: Oct. 31, 2002

(65) Prior Publication Data

US 2003/0126943 A1 Jul. 10, 2003

Related U.S. Application Data

(63) Continuation-in-part of application No. 09/800,287, filed on Mar. 6, 2001, now abandoned, and a continuation-in-part of application No. 09/112,604, filed on Jul. 9, 1998, now abandoned, and a continuation-in-part of application No. 08/580,279, filed on Dec. 27, 1995, now abandoned, and a continuation of application No. 08/396,451, filed on Feb. 28, 1995, now abandoned, which is a continuation of application No. 08/096,023, filed on Jul. 22, 1993, now abandoned.

(51) Int. Cl.⁷ ............................................. C22B 34/12
(52) U.S. Cl. .................... 75/10.12; 75/10.18; 75/10.26; 75/380
(58) Field of Search ............................. 75/10.12, 10.18, 75/10.26, 380

(56) References Cited

U.S. PATENT DOCUMENTS

| | | | |
|---|---|---|---|
| 2,853,375 A | 9/1958 | Ensio | 75/31 |
| 3,765,868 A | 10/1973 | Moklebust | 75/1 |
| 3,856,918 A | 12/1974 | Skrivan et al. | 423/69 |
| 3,932,171 A | 1/1976 | Tylko | 75/10 |
| 4,416,689 A | 11/1983 | Collin | 75/11 |
| 5,244,488 A | 9/1993 | Sato et al. | 75/10.19 |

FOREIGN PATENT DOCUMENTS

| | | | |
|---|---|---|---|
| GB | 2122223 | | 1/1984 |
| JP | 09/20908 A | * | 8/1997 |
| WO | 90/08843 | | 8/1990 |

OTHER PUBLICATIONS

Minek (Pyrometallurgy Divison), Report No. M304, Brent, A.D. Jul. 15, 1987, "The Smelting of Ilmentie in a d.c. Transferred–Arc Plasma Furnace with a Molten–Anode Configuration".

* cited by examiner

Primary Examiner—George Wyszomierski
(74) Attorney, Agent, or Firm—Marshall, Gerstein & Borun

(57) ABSTRACT

A process is provided for the production of titania rich slag from ilmenite. The ilmenite is fed together with carbonaceous reductant, and in the absence of fluxes, to the molten bath of a D.C. arc furnace. The molten bath of the furnace forms the anode and one or more electrodes in the roof of the furnace forms the cathode. A frozen lining is established and maintained between the refractory lining of the furnace and the molten bath and the process includes means to control the thickness of the frozen lining as well as the whole smelting process.

19 Claims, 1 Drawing Sheet

PRODUCTION OF HIGH TITANIA SLAG FROM ILMENITE

RELATED APPLICATIONS

This is a Continuation-in-Part of application Ser. No. 09/800,287 filed on Mar. 6, 2001 now abandoned, itself a Continuation-in-Part Application of application Ser. No. 09/112,604 filed on Jul. 9, 1998 now abandoned; itself a Continuation-in-Part Application of application Ser. No. 08/580,279 filed on Dec. 27, 1995 now abandoned, itself a Continuation Application of application Ser. No. 08/396,451 filed on Feb. 28, 1995 now abandoned, which was a Continuation Application of application Ser. No. 08/096,023, filed on Jul. 22, 1993 now abandoned.

FIELD OF THE INVENTION

This invention relates to the production of high titania slag from ilmenite and control of such a process.

BACKGROUND TO THE INVENTION

Natural rutile, owing to its high titanium content and low levels of problem-causing impurities, has traditionally been the preferred feed stock for the production of titanium tetrachloride as an intermediate towards the production of titanium dioxide. Natural rutile is becoming scarcer and, consequently more costly, and the alternative method that uses ilmenite is becoming more favoured.

Ilmenite concentrates have a relatively low titanium content (usually about 50% titanium dioxide compared to about 96% in the case of rutile) and the high impurity content in the balance renders ilmenite generally unsuitable for direct chlorination to titanium tetrachloride as in the case of rutile. In consequence, ilmenite has been used as feed stock for the production of pigment by the sulphate process, which is becoming increasingly environmentally objectionable.

The alternative to the sulphate route, namely the chloride route, has a major problem associated therewith in that the direct chlorination of ilmenite results in a large quantity of ferric chloride being produced with an associated waste disposal problem. The chloride production of pigment is however preferred over the sulphate route because it requires less processing energy and yields a pigment of superior quality.

In general, manufacturers of the intermediate titanium tetrachloride are economically unable to process feed stocks containing less than 80% $TiO_2$ and, in addition, impose stringent limits on some impurities, in particular calcium and magnesium. The latter two elements are undesirable in fluidised bed chlorinators because they form high boiling point chlorides, which tend to clog both the bed itself and gas ducting leading from the reactor. The usual specification imposed on calcium and magnesium is that the sum of the oxides of these two elements should not exceed 1.2% by mass. In some cases the limits are imposed as not greater than 0.2% calcium oxide and not greater than 1.0% magnesium oxide.

In consequence of the unsuitability of ilmenite for direct use in the chloride process, processes involving the thermal reduction of ilmenite to produce a titania rich slag as well as a process involving combined prereduction and chemical leaching procedures to form a synthetic rutile have been proposed and used.

Of these the thermal reduction approach yields a product having a lower titanium grade but it does have the advantage of producing iron in a directly recoverable state.

Conventional alternating current open-arc smelting of various types of ilmenite ores is currently being carried out. The feed materials are introduced into a conventional six-in-line open-arc smelter via multiple feed ports (typically more than 20 feed ports are used) most of which are situated near sidewalls of the furnace in order to protect the furnace sidewalls from refractory erosion. This type of feeding renders process control extremely difficult and, as a result, irrespective of sophisticated computerised control that can be applied to such furnaces, localised regions of overreduced slag are periodically produced which gives rise to a foaming slag. This is regarded as loss of control and corrective measures, which need to be taken, lower the thermal efficiency and availability of the furnace.

Ilmenite has also been smelted in a direct current (D.C.) transferred-arc plasma furnace, on test level and also on commercial level. Some of the problems experienced in the testing of the D.C. smelting of ilmenite included wear of the furnace lining, which are normally magnesite based, that results in unacceptably high product contamination. It is also difficult to establish and maintain a frozen lining to act as a barrier between the refractory lining and furnace charge.

One of the problems with the frozen lining is that it is very sensitive to fluctuations in the power density in the furnace, which may result in a decrease in the frozen lining thickness and a simultaneous release of contaminants into the furnace charge, or an increase in the frozen lining thickness that reduces the internal volume of the furnace and lowers its efficiency.

OBJECT OF THE INVENTION

It is an object of this invention to provide a process for the thermal reduction of ilmenite in which the problems mentioned above is at least partly obviated.

SUMMARY OF THE INVENTION

In accordance with this invention there is provided a process for the reduction of ilmenite in a D.C. transferred arc furnace having a refractory lining and operating with a molten bath, one or more electrodes situated in the roof of the furnace acting as cathode, the molten bath acting as anode, and a frozen lining at least partly between the refractory lining and the molten bath; the process comprising feeding the ilmenite simultaneously with carbonaceous reductant, in the absence of fluxes, to the molten bath, withdrawing titania rich slag and pig iron from the furnace, and means to control the operation of the furnace; the control means including means to take temperature measurements of a furnace wall adjacent the frozen lining, means to estimate the thickness of the frozen lining as a function of the temperature in the furnace wall and means to control the amount of titanium dioxide produced in the furnace to urge a thickness of the frozen lining towards a predetermined reference value.

There is also provided for the control means to include means to measure furnace gas flow rate, furnace gas temperature and furnace gas composition; means to measure furnace cooling water flow rate and furnace cooling water temperature, means to measure feed rates of the ilmenite and the carbonaceous reductant, means to measure the furnace electrical system variables including furnace power input and furnace resistance, and means to measure the ilmenite and carbonaceous reductant composition.

The invention further provides for means to estimate the frozen lining thickness and furnace hot face temperatures as a function of the furnace wall temperature measurements and furnace gas flow, furnace gas composition and furnace gas temperature measurements.

There is also provided for the means to control the amount of titanium dioxide produced in the furnace to include control over the rate of addition of carbonaceous reductant to the furnace, for the amount of titanium dioxide produced to increase with an increase in the rate of addition of carbonaceous reductant to the furnace to thereby urge the thickness of the frozen lining to increase; and for the amount of titanium dioxide produced to decrease with a decrease in the rate of addition of carbonaceous reductant to the furnace to thereby urge the thickness of the frozen lining to decrease.

There is also provided for means to calculating heat losses from the furnace as a function of the furnace gas flow, furnace gas composition and furnace gas temperature, the cooling water flow rate and cooling water temperatures; and for means to measure sensible heat changes of spray cooled roof panels, spray cooled off gas ducts, film cooled shell panels, air cooled hearth panels, hot gases and dust, and charge removed from the furnace.

The invention also provides for means to estimate a material balance of the furnace as a function of the estimated frozen lining thickness, the ilmenite and carbonaceous reductant feed rates, the ilmenite carbonaceous reductant, slag and pig iron composition measurements, and the furnace power input and furnace resistance measurements.

There is further provided for means to perform inventory control over the furnace using the material balance of the furnace.

The invention further provides for means to estimate a future titanium dioxide composition of the slag and carbon content of the pig iron as a function of the estimated frozen lining thickness and furnace wall temperatures, the calculated heat changes, the feed and product compositions and temperature measurements, the furnace gas composition, the furnace gas flow rate and furnace gas temperature measurements, the amount of slag and pig iron tapped from the furnace and the internal and sensible heat energy content of the tapped slag and pig iron, and power input to the furnace.

There is also provided for means to perform chemistry control of the furnace using the estimated material balance, the current and predicted slag titanium dioxide composition and pig iron carbon content, the ilmenite and carbonaceous reductant feed rate setpoints, the furnace power input, and the ilmenite and carbonaceous reductant composition measurements.

The invention further provides for means to perform start-up control of the furnace using the feed rate setpoints, the furnace power and resistance setpoints, the ilmenite and carbonaceous reductant composition measurements, and the calculated heat losses.

There is also provided for a process of error detection and validation to be conducted on all of the above measurements, for the process of error detection and validation to include analysis of the range of the measurements and the rate of change of the measurements to validate the measurements, and for invalid measurements to be labelled as bad quality, and also for further calculations using these invalid measurements to be labelled as bad quality, until such time as the error has been corrected.

The invention further provides for the furnace to be circular, for one or more of the electrodes to be hollow and to serve as a feed port for at least part of the ilmenite and the carbonaceous reductant, and for the ilmenite and the carbonaceous reductant to be fed to a central region of the furnace.

The invention also provides a method for controlling a frozen lining between a furnace lining and a molten bath in a D.C. transferred arc furnace used for the continuous reduction of ilmenite, the method comprising the steps of:

1. establishing the frozen lining,
2. measuring at least the temperature in a wall of the furnace adjacent the frozen lining,
3. estimating the thickness of the frozen lining as a function of the temperature in the wall, and
4. controlling the amount of titanium dioxide produced in the furnace to urge a thickness of the frozen lining towards a predetermined reference value.

There is also provided for step 2 of the method to include measuring furnace gas flow rate, furnace gas temperature and furnace gas composition, furnace cooling water flow and temperature, ilmenite and carbonaceous reductant feed rates, furnace power input and furnace resistance, and ilmenite and carbonaceous reductant composition measurements.

The invention also provides for the method to include performing a process of error detection and validation on the measurements, the process of error detection and validation including the steps of a) analysing the range of the measurements and the rate of change of the measurements,
b) validating the measurements,
c) labelling invalid measurements as bad quality, and
d) labelling further calculations using the invalid measurements as bad quality until such time as the error has been corrected.

The invention further provides for step 3 of the method to include a step of estimating the thickness of the frozen lining as a function of the temperature in the furnace wall and the furnace slag and the furnace gas temperature.

BRIEF DESCRIPTION OF THE DRAWINGS

An embodiment of the invention will be described by way of example only and with reference to the drawings in which.

DETAILED DESCRIPTION OF THE INVENTION

Figure 1:
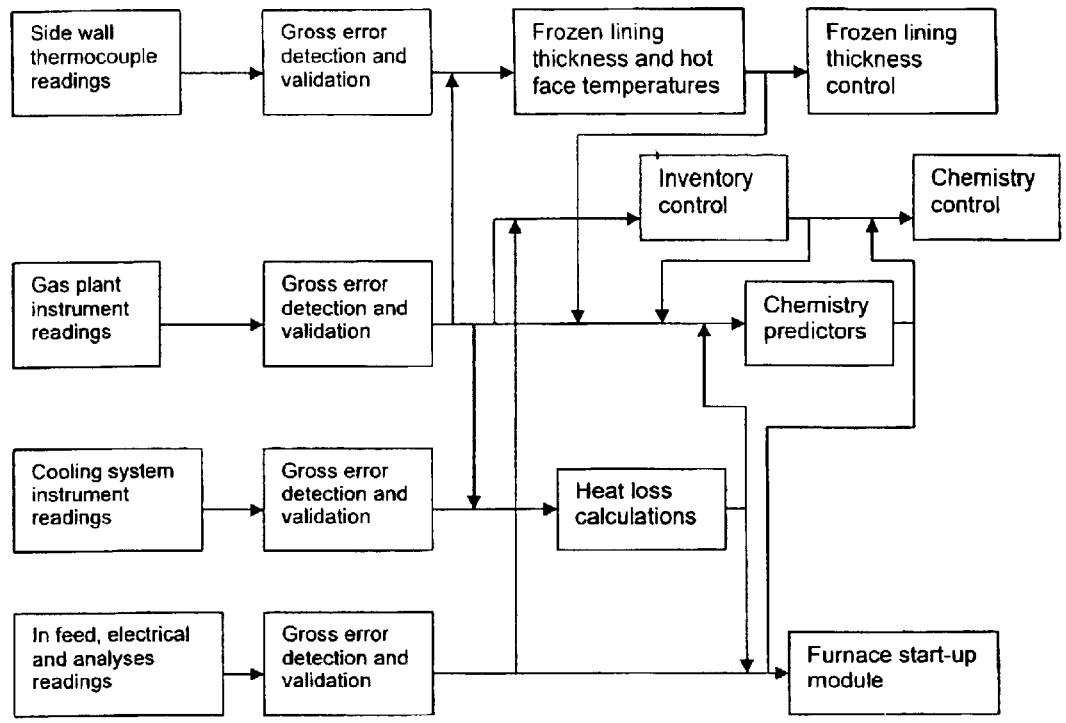
FIG. 1 is a schematic representation of the logic of a control process for a furnace according to the invention.

A process control layout for a D.C. transferred furnace (not shown) with a refractory lining and a molten bath is generally depicted by reference numeral 1 in the FIG. 1. The furnace has a frozen lining (not shown) between the refractory lining and the charge.

Ilmenite mineral sand is smelted using anthracite as a reductant in the furnace. The furnace is refractory lined with magnesite bricks. Cold ilmenite, preheated ilmenite and anthracite are fed into the furnace through a hollow electrode. High titania slag and metallic iron are periodically tapped form the furnace. Hot gas containing dust is removed from the furnace through a single off gas duct where it is subsequently cleaned in a gas scrubbing plant. A film of flowing water cools the furnace shell. The roof panels and off gas panels are spray cooled and the hearth of the furnace is air-cooled.

The furnace frozen lining and chemistry are controlled by the amount of energy and carbon reductant input.

Instrument readings from the D.C. transferred arc furnace include furnace sidewall thermocouple measurements (2), furnace gas flow, furnace gas composition and furnace gas temperature measurements (3), cooling water flow rate and cooling water temperature measurements (4), ilmenite and carbonaceous reductant feed rates, electrical system, and charge and product chemical composition measurements (5).

A process of error detection and validation (6) is conducted on the instrument measurements. The process includes analysis of the range of the measurements and the rate of change of the measurements to validate the measurements, the labelling of invalid measurements as bad quality, and also for further calculations using these invalid measurements to be labelled as bad quality until such time as the error has been corrected.

Once the measurements have been validated, they are utilised for the control of the process. If the measurements are labelled as bad quality they are only used once they become valid again.

The frozen lining thickness and hot face temperatures are calculated (7) as a function of the sidewall thermocouple measurements (2) and gas temperature measurements (3). The calculated frozen lining thickness and hot face temperatures (7) are used to control the frozen lining thickness (11).

The heat losses from the furnace are estimated (8) as a function of the gas flow, temperature and composition measurements (3), and the cooling system flow and temperature measurements (4).

The sensible heat changes of spray cooled roof panels (not shown), spray cooled off gas ducts (not shown), film cooled shell panels (not shown), air cooled hearth panels (not shown), hot gasses and dust (not shown), and charge removed from the furnace (not shown) are also measured and used in the determination of the heat losses from the furnace (8).

A material balance of the furnace (not shown) is determined and is used in the inventory control (9) of the furnace. The material balance (not shown) is determined as a function of the estimated frozen lining thickness (7), the ilmenite and anthracite feed rate measurements, electrical power input, the slag and iron composition measurements, and the ilmenite and anthracite composition measurements (5).

A predicted slag titanium dioxide composition and iron carbon content composition (10) is estimated as a function of the calculated frozen lining thickness and hot face temperatures (7), the calculated heat losses (8), and the calculated material balance (not shown). The predicted future slag titanium dioxide composition and iron carbon content (10), together with the estimated material balance (not shown), the feed rate measurements, electrical system measurements including power input and resistance, and ilmenite and carbonaceous reductant composition measurements (5) are used to perform chemistry control over the furnace (12).

Start-up control over the furnace (13) is performed using the feed rate measurements the electrical power setpoint, the ilmenite and anthracite composition measurements (5) and the estimated heat losses (8).

Data Validation

Plant instruments can fail or drift, thereby giving invalid or inaccurate readings. This would make any calculation or model useless. For this reason, all raw data readings used by the control system go through an error detection and data validation process. The quality of the readings is marked as either good or bad. The model components are marked as either enable or disabled based on the status of their input tags. In the gross error detection, the range of the reading and its rate of change are checked for abnormalities. The data is validated by either a set of logical rules or neural network models from where important data that is for some reason invalid is labelled as bad quality. This data is not used in further calculations until such time as the error has been corrected.

Temperature Profiles and Frozen Lining Thickness Estimations

Dual furnace sidewall thermocouples are used to read the temperature of the furnace sidewalls, and together with knowledge of the thermal conductivity of the frozen lining and the refractory lining, an internal node calculation is performed to determine the temperature at any point between a sidewall thermocouple and the hot face, which is the interface between the refractory and frozen lining. This information is used to calculate the hot face temperature and frozen lining thickness.

The value of the frozen lining thickness is used in the frozen lining thickness control. This value is of more use in the frozen lining control than just the thermocouple readings, because it takes non-steady state conditions and time lapses between thermocouple readings and the frozen lining thickness into account.

Inventory Control

The total amount of material, including the dust losses, and power added to the furnace between taps is determined for use in inventory control. The analysis of certain elements in the feed materials, slag and iron are used in the material balance to determine the relative amounts of slag and iron produced. The amount of frozen slag is taken into account via the frozen lining thickness calculation. Bath heights are calculated through the relationship between mass and volume. The relative amounts of slag and iron to be tapped are then determined using the heights of the tap holes as reference points. During the addition of electrodes, sounding measurements are taken through the hollow electrode. The actual measurements of the slag and iron bath heights are used to "zero" the control process calculation on almost a daily basis.

Heat Loss Calculations

Heat lost through the cooling system and exiting streams from the furnace are calculated by means of the sensible heat gain or loss of the cooling medium and exiting stream. The spray cooled roof panels, spray cooled off gas ducts, film cooled shell panels, air cooled hearth panels, hot gasses and dust, and charge removed from the furnace are all used to take readings from for the heat loss calculations.

Chemistry Predictors

Neural network models with high correlation coefficients are used to predict the current % $TiO_2$ in the slag, % C in the iron and % $Fe_2O_3$ in the ilmenite as well as those of 2 hours in the future. This data is used for feed forward control in the material and energy balance of the decision support module. The neural network models are extensive. There are approximately 42 inputs to each of the iron and slag models and 6 to the ilmenite model. Inputs include the data derived from the other modules (frozen lining thickness, inventory control, heat loss). The models auto train as the plant conditions change.

Frozen Lining Control

The philosophy used in the control of the freeze lining is that the frozen lining is viewed as an additional layer of "bricks". As long as the frozen lining is maintained, the magnesite bricks will remain in tact and should not have to be replaced for many years. The maintenance of an even and uniform frozen lining means that the bath size is kept constant which makes for better operational control. Tight control of the frozen lining thickness is achieved by making regular changes to the C reductant addition rates in both the positive (frozen lining getting thinner because of an increased rate of heat production) and negative (frozen lining getting thicker because of an decreased rate of heat production) directions. To this end the amount of titanium dioxide in the furnace is used as a measure for the control over the frozen lining control.

Chemistry Control

The reaction governing the process is given by:

$$FeTiO_3 + C + heat \rightarrow Fe + TiO_2 + CO$$

Figure 3:
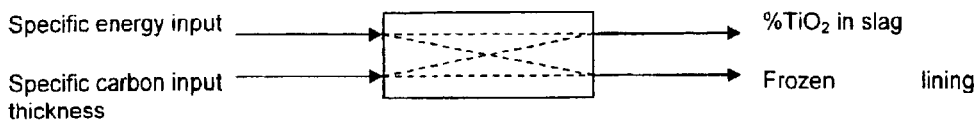
FIG. 3 is a schematic representation of the multi use of input information in the chemistry control.

The control objectives are to maintain the %$TiO_2$ in the slag of 86% with minimal deviation and to maintain the freeze lining. This is achieved through manipulation of the C reductant addition rate (AIR, carbonaceous reductant to ilmenite ratio) and the energy input (IPR, ilmenite to power ratio). The system is interactive in that both of the manipulated variables influence both of the controller variables, as is shown in FIG. 3.

There are two portions to the control strategy, namely a feed forward portion (ff) and a feed back portion (fb). The feed forward portion attempts to absorb the disturbances introduced by varying feed material composition (ilemite and carbonaceous reductant analyses) and the feed back portion reacts on measurements of the controlled variables (% $TiO_2$ in slag and freeze lining thickness);

Eff+Efb=Etot (IPR—specific energy, kg ilmenite per (MWh)

Cff+Cfb=Ctot (AIR—specific carbon, kg carbonaceous reductant per ton of ilmenite)

The Eff portion is determined from a hard coded energy balance and the Cff from a hard coded material balance.

The Efb and Cfb portions are equivalent to the changes that were conventionally made by the shift supervisors based on the % $TiO_2$ in the slag as-tapped and the sidewall thermocouple readings respectively. In the decision support system, these portions are determined by a fuzzy logic rule set that was derived from the experiences or operational staff and on line tuning.

Figure 2:
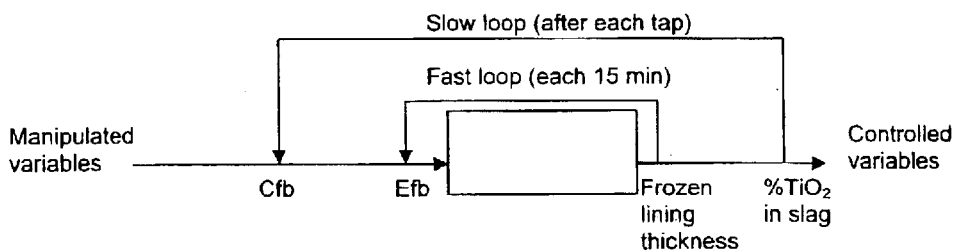
FIG. 2 is a schematic representation of the feed back used in the control process

The feed back portion consists of two loops, one fast and the other slow, as is shown in FIG. 2

The fast loop is run every 15 minutes and uses the estimated frozen lining thickness. The slow loop is run after each tap and uses the %$TiO_2$ in the slag.

Start-up Module

During a furnace stoppage, the length of the stoppage and energy lost is integrated. A given percentage of the lost energy is then recovered through a specified power ramp, IPR and AIR schedule. One the start-up module is completed, the system switches back to the chemistry and freeze lining control modules.

What We claim as new and desired to secure by Letters Patent is:

1. A continuous process for the reduction of ilmenite in a D.C. transferred arc furnace having a refractory lining and operating with a molten bath, one or more electrodes situated in the roof of the furnace acting as cathode, the molten bath acting as anode, and a frozen lining at least partly between the refractory lining and the molten bath, the process comprising the steps of:

feeding the ilmenite simultaneously with carbonaceous reductant, in the absence of fluxes, to the molten bath;

withdrawing titania rich slag and pig iron from the furnace;

and controlling the operation of the furnace, the step of controlling the furnace including the steps of taking temperature measurements of a furnace wall adjacent the frozen lining, estimating the thickness of the frozen lining as a function of the temperature in the furnace wall, and controlling the amount of titanium dioxide in the furnace to urge a thickness of the frozen lining towards a predetermined reference value.

2. A process as claimed in claim 1, wherein said step of controlling the operation of the furnace further includes the steps of: measuring furnace gas flow rate, furnace gas temperature and furnace gas composition; measuring furnace cooling water flow rate and furnace cooling water temperature; measuring ilmenite feed rate and carbonaceous reductant feed rate; measuring furnace electrical system variables including furnace power input and furnace resistance; and measuring ilmenite composition and carbonaceous reductant composition.

3. A process as claimed in claim 2 in which the frozen lining thickness and a furnace hot face temperature are estimated as a function of the furnace wall temperature measurements and the furnace gas temperature.

4. A process as claimed in claim 2 or claim 3 in which the step of controlling the operation of the furnace also includes calculating heat losses from the furnace as a function of the furnace gas flow rate, furnace gas temperature and furnace gas composition measurements, and the cooling water flow rate and cooling water temperature measurements.

5. A process as claimed in claim 2 or claim 3 in which the step of controlling the operation of the furnace also includes measuring sensible heat changes of spray cooled roof panels, spray cooled off gas ducts, film cooled shell panels, air cooled hearth panels, hot gasses and dust, and charge removed from the furnace.

6. A process as claimed in claim 5, in which the step of controlling the operation of the furnace further includes estimating heat losses from the furnace as a function of the estimated frozen lining thickness and furnace wall temperatures, the furnace gas temperature, the furnace gas composition, the furnace gas flow rate, the cooling water flow rate and cooling water temperature, and the measured sensible heat changes.

7. A process as claimed in claim 6 in which the step of controlling the operation of the furnace includes performing start-up control of the furnace using ilmenite and carbonaceous reductant feed rate setpoints, the furnace power and resistance setpoints, the ilmenite and carbonaceous reductant composition measurements, and the estimated heat losses from the furnace.

8. A process as claimed in claim 5, in which the step of controlling the operation of the furnace includes estimating heat losses from the furnace as a function of the furnace gas flow rate, the furnace gas temperature and the furnace gas composition measurements, the cooling water flow rate and cooling water temperature, and the measured sensible heat changes.

9. A process as claimed in claim 2 or 3 in which the step of controlling the operation of the furnace includes estimating a material balance of the furnace as a function of the estimated frozen lining thickness, the ilmenite and carbonaceous reductant feed rates, the furnace power input and furnace resistance, the ilmenite and carbonaceous reductant composition measurements, and slag and pig iron composition measurements.

10. A process as claimed in claim 9 in which inventory control is performed on the furnace using the material balance.

11. A process as claimed in claim 9 in which the step of controlling the operation of the furnace includes estimating a slag titanium dioxide composition and pig iron carbon content composition as a function of the estimated frozen lining thickness and furnace wall temperatures, the estimated heat losses from the furnace, the feed composition and previously withdrawn titania rich slag and pig iron compositions and temperature measurements of the feed material and previously withdrawn titania rich slag and pig iron, the furnace gas composition, furnace gas flow rate and furnace gas temperature measurements, the amount of slag and pig iron withdrawn from the furnace and the internal and sensible heat energy content of the withdrawn slag and pig iron, and power input to the furnace.

12. A process as claimed in claim 11 in which the step of controlling the operation of the furnace includes performing chemistry control of the furnace using the estimated material balance, estimated slag titanium dioxide composition and pig iron composition and previously withdrawn titania rich slag and pig iron compositions; ilmenite and carbonaceous reductant feed rate setpoints, the furnace power input, and the ilmenite and carbonaceous reductant composition measurements.

13. A process as claimed in claim 2 in which a process of error detection and validation is conducted on the measurements, the process of error detection and validation including the steps of
   a) analysing the range of the measurements and the rate of change of the measurements
   b) validating the measurements,
   c) labelling invalid measurements as bad quality, and
   d) labelling further calculations using the invalid measurements as bad quality.

14. A process as claimed in claim 1 or claim 2 in which the furnace is circular, one or more of the electrodes is hollow and serves as a feed port for at least part of the ilmenite and the carbonaceous reductant, and the ilmenite and the carbonaceous reductant are fed to a central region of the furnace.

15. A process as claimed in claim 1 in which the step of controlling the amount of titanium dioxide in the furnace includes controlling the rate of addition of carbonaceous reductant to the furnace; the amount of titanium dioxide increasing with an increase in the rate of addition of carbonaceous reductant to the furnace to thereby urge the thickness of the frozen lining to increase; and the amount of titanium dioxide produced decreasing with a decrease in the rate of addition of carbonaceous reductant to the furnace to thereby urge the thickness of the frozen lining to decrease.

16. A method for controlling a frozen lining between a furnace lining and a molten bath in a D.C. transferred arc furnace used for the continuous reduction of ilmenite, the method comprising the steps of
   1) establishing a frozen lining,
   2) measuring at least the temperature in a wall of the furnace adjacent the frozen lining,
   3) estimating the thickness of the frozen lining as a function of the temperature in the wall, and
   4) controlling the amount of titanium dioxide produced in the furnace to urge a thickness of the frozen lining towards a predetermined reference value.

17. A method as claimed in claim 16 in which step 2 of the method includes measuring the furnace gas flow rate, furnace gas temperature and furnace gas composition, furnace cooling water flow and temperature, ilmenite and carbonaceous reductant feed rates, furnace power input and furnace resistance, and ilmenite and carbonaceous reductant composition measurements.

18. A method as claimed in claim 17 which includes performing a process of error detection and validation on the measurements, the process of error detection and validation including the steps of
   a) analysing the range of the measurements and the rate of change of the measurements,
   b) validating the measurements,
   c) labelling invalid measurements as bad quality, and
   d) labelling further calculations using the invalid measurements as bad quality until such time as the error has been corrected.

19. A method as claimed in claim 18 in which step 3 of the method includes an estimation of the thickness of the frozen lining as a function of the temperature in the furnace wall and a temperature of the furnace slag and the furnace gas temperature.

* * * * *